Jan. 16, 1962  A. KEBEKUS ET AL  3,017,314
APPARATUS FOR PRODUCING PLASTIC BAGS
Filed Oct. 14, 1960

Inventors
ALFRED KEBEKUS
WERNER ROSENBOOM
By Michael S. Striker
Attorney

United States Patent Office 3,017,314
Patented Jan. 16, 1962

3,017,314
APPARATUS FOR PRODUCING PLASTIC BAGS
Alfred Kebekus, Nordenham, and Werner Rosenboom, Esenham, Germany, assignors to Norddeutsche Seekabelwerke Aktiengesellschaft, Nordenham, Germany, a corporation of Germany
Filed Oct. 14, 1960, Ser. No. 62,753
Claims priority, application Germany October 24, 1959
4 Claims. (Cl. 156—498)

The present invention relates to an apparatus for producing bags from a tube of thermoplastic material.

A known method of producing bags from a tube of plastic material, such as polyethylene or polyvinyl chloride, consists in closing the ends of each bag by gathering the tubular material at the desired point, welding the gathered part together and simultaneously severing the welded part transversely of the tube into two pieces. By this known method it is possible by a single operation to form and seal the two adjacent ends of two successive bags. The tubular material used for this method may either consist of tubular sheet material or of a tubular net. During the welding operation, the parts to be welded are usually cooled by means of air. Such a cooling operation requires, however, rather expensive apparatus, and it also wastes time and, in particular, is not sufficiently effective.

It is an object of the present invention to overcome the above-mentioned disadvantages of the known method by cooling severed edge portions of the welded parts by means of a metallic element which is moved into engagement with these severed end portions. This has the advantage that the heat of the welding operation will be dissipated by the highly heat-conductive metal element very quickly and effectively from the same surfaces from which this heat was transmitted to the workpiece for the welding and severing operation.

The known apparatus for dividing the tube into adjacent bags by welding essentially consists of two adjacent clamping fixtures which are adapted to clamp the plastic tube at two points which are spaced from each other, and of a heatable welding blade which is slidable between these two clamping fixtures within a plane which extends perpendicularly to the tube. For producing the ends of two adjacent bags, the material of the tube is gathered at the desired point and this gathered part is clamped between the two clamping fixtures and the heated welding blade is then passed transversely through the gathered part, whereby this part will be welded firmly together and the welded part will at the same time be severed into two pieces.

According to the present invention, the apparatus as above described is further provided with a metallic cooling element in the form of a cooling blade which may be moved within the same plane as the welding blade and which is adapted to be brought into engagement with the severed welded surfaces of the plastic tube immediately after the welding blade has been withdrawn. In order to attain a positive contact of the cooling blade with the severed surfaces, it is advisable to design at least one of the clamping fixtures so as to be movable in lateral directions, and to provide suitable control means which will at first move this clamping fixture laterally away from the path of movement of the cooling blade when the latter is moving toward the welded parts, and which will move the clamping fixture in the opposite direction when the cooling blade has reached its forward end position so as to move the welded end surfaces of the plastic material into engagement with the cooling blade. If desired, the cooling blade may also be provided with additional cooling means, for example, by circulating water through the blade. Such additional cooling means are, however, usually not required if the cooling blade is made of sufficiently large dimensions.

The above-mentioned as well as other objects, features, and advantages of the present invention will become further apparent from the following detailed description thereof, particularly when the same is read with reference to the accompanying diagrammatic drawings, in which—

FIGURE 2 shows a plan view of the apparatus in one position during its operation; while

Figure 2:
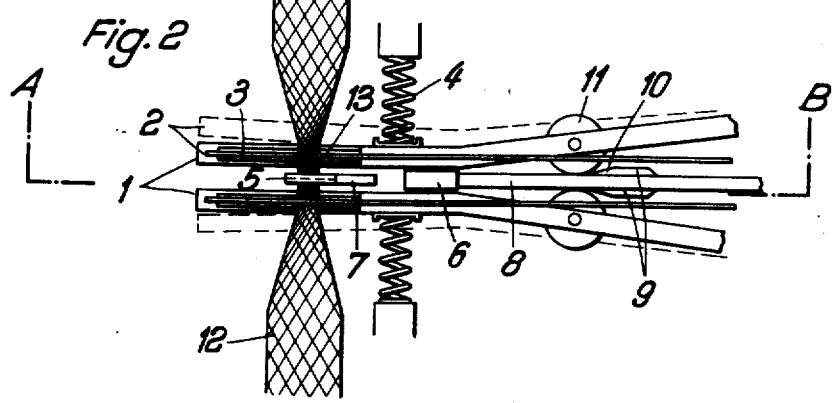

Referring to the drawings, in which only those parts of the welding and severing apparatus according to the invention are shown which are essential for proper understanding of the present invention, this apparatus comprises a pair of clamping fixtures 1, each of which consists of a pair of clamping jaws 2 and 3 which in the engaged position are pressed against each other, for example, by spring pressure. These clamping fixtures are maintained in the normal position relative to each other as shown in FIGURE 2 by means of springs 4. A welding blade 5 and a cooling blade 6 are disposed between the two clamping fixtures 1 and they are both movable within the same vertical plane. Welding blade 5 is secured to a lever 7 which is pivotable about a horizontal axis, while cooling blade 6 which is mounted on the free end of an arm 8 is slidable by means of this arm in a longitudinal direction between the two clamping fixtures 1. On its two sides, arm 8 is provided with a pair of cams 9 with wedge-shaped front surfaces 10, which are adapted to engage with rollers 11 on the rear parts of jaws 2 to move the two clamping fixtures 1 further apart against the action of springs 4 when the arm 8 with cooling blade 6 thereon is moved forwardly.

Figure 1:
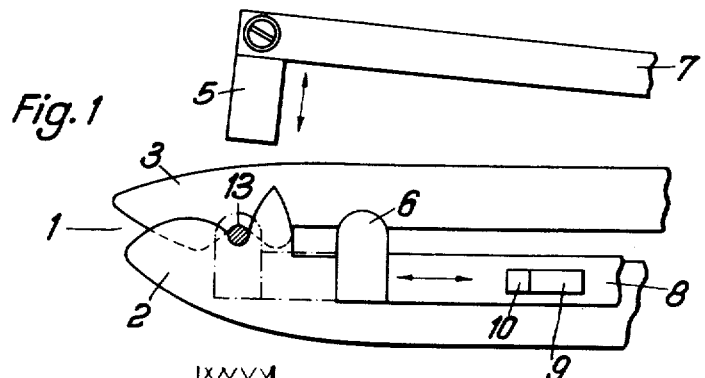
FIGURE 1 shows a side elevation of the different parts of a welding and severing apparatus according to the invention, as seen in a section along the line A—B of FIGURE 2.
Figure 3:
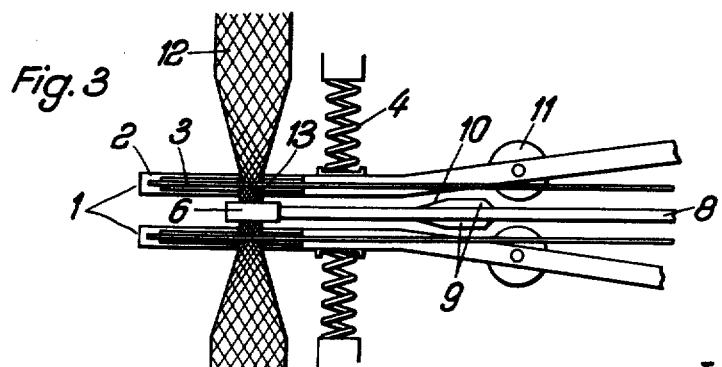
FIGURE 3 shows a plan view of the apparatus in another position during its operation.

The operation of this apparatus is as follows:

After the gathered intermediate portion 13 of the plastic tube or tubular net 12 has been tightly clamped by the clamping fixtures 1, the heated welding blade 5 is pivoted downwardly upon the gathered intermediate portion 13 between the clamping fixtures 1 as indicated in FIGURE 2 and it thereby heats and softens this portion 13. Due to its own weight, welding blade 5 then penetrates through the softened portion 13 and thereby welds the material of the tube adjacent to this point, and simultaneously cuts transversely through the tube, thereby separating it into two pieces which subsequently form two adjacent bags. During this operation, the cooling blade 6 is located in the position as indicated in FIGURE 2. Welding blade 5 is then again lifted to the position as shown in FIGURE 1, and either simultaneously or thereafter cooling blade 6 is shifted forwardly from the position as shown in FIGURE 2 to the position as shown in solid lines in FIGURE 3 and in dot-and-dash lines in FIGURE 1. Cams 9 on arm 8 of the cooling blade then act against rollers 11 on jaws 2 and thereby shift the clamping fixtures laterally apart to the position as shown in dotted lines in FIGURE 2, whereby the bag ends which were welded closed in the previous severing operation are shifted apart so as to make room for the advancing cooling blade 6. As soon as arm 8 has been moved forwardly to such an extent that cams 9 disengage from rollers 11, while the cooling blade 6 assumes its final or operative position in which it is disposed between the welded ends of the two adjacent bags, the two clamping fixtures 1 are again pushed toward each other by the action of springs 4 to the position as illustrated in FIGURE 3, whereby the surfaces along which the two pieces were severed by the blade 5 are moved into engagement with the cooling blade 6 and are rapidly cooled thereby. Thereafter clamping fixtures 1 may be loosened and the two welded tubular pieces or bags may be removed from the apparatus.

Although our invention has been illustrated and described with reference to the preferred embodiment thereof we wish to have it understood that it is in no way limited to the details of such embdoiment but is capable of numerous modifications within the scope of the appended claims.

Having thus fully discloved our invention, what we claim is:

1. In a welding and severing apparatus for producing bags from a tube of plastic material comprising a pair of clamping fixtures disposed laterally adjacent to but spaced from each other, and a heatable welding blade adapted to be moved within a plane perpendicular to said tube for welding a tightly closed intermediate portion of said tube and for simultaneously severing the welded intermediate portion into two pieces, each of which is held by a clamping fixture, the improvement comprising a metallic cooling element, means for moving said cooling element within the same plane as said welding blade, and means for controlling the movement of said cooling element in a timed relation to the movement of said welding blade so that said element will be moved into a final position of engagement with the surfaces along which said two pieces were severed after said welding blade has been moved away from said surfaces.

2. An improvement as defined in claim 2, in which said control means comprise means for moving at least one of said clamping fixtures in lateral directions so that, when said cooling element is moved toward the welded pieces, said one clamping fixture is at first moved laterally out of the path of movement of said cooling element, while when said cooling element has been moved to its final position between said surfaces, said one clamping fixture is moved toward said cooling element so as to move the surface of the piece held by said one clamping fixture into positive engagement with said cooling element.

3. An improvement as defined in claim 3, in which said control means further comprise a cam member secured to said cooling element at one side thereof, said cam member being adapted to engage with said one clamping fixture when said cooling element is moved toward said surfaces so as to move said one clamping fixture together with the respective piece laterally out of the path of the further forward movement of said cooling element toward said final position thereof.

4. An apparatus for welding, severing and cooling a closed intermediate portion of a plastic tube to form a pair of plastic bags, said apparatus comprising a pair of clamping fixtures disposed laterally adjacent to but spaced from each other so as to engage two spaced points of the intermediate portion; a heatable welding blade disposed in a plane substantially perpendicular to the intermediate portion of the tube and extending between said clamping fixtures, said blade movable between said clamping fixtures to weld and to simultaneously sever the intermediate portion whereby the tube is transformed into two bags each of which has a sealed end portion engaged by one of said clamping fixtures; a metallic cooling element disposed in the plane of said blade; and means for moving said cooling element between said clamping fixtures and into contact with the end portions of the bags to cool the same.

References Cited in the file of this patent

UNITED STATES PATENTS 2,676,642     Bergstein _____ Apr. 27, 1954

UNITED STATES PATENT OFFICE
CERTIFICATE OF CORRECTION

Patent No. 3,017,314 January 16, 1962

Alfred Kebekus et. al.

It is hereby certified that error appears in the above numbered patent requiring correction and that the said Letters Patent should read as corrected below.

Column 3, line 30, for the claim reference numeral "2" read -- 1 --; column 4, line 6, for the claim reference numeral "3" read -- 2 --.

Signed and sealed this 19th day of November 1963.

(SEAL)
Attest:

ERNEST W. SWIDER
Attesting Officer

EDWIN L. REYNOLDS

Acting Commissioner of Patents